(12) United States Patent
Shirron et al.

(10) Patent No.: US 8,891,935 B2
(45) Date of Patent: Nov. 18, 2014

(54) MULTI-VIDEO RENDERING FOR ENHANCING USER INTERFACE USABILITY AND USER EXPERIENCE

(75) Inventors: Dan Shirron, Givaat Ada (IL); Reuben Bareli, Herzliya (IL); Eyal Toledano, Kiryat Ata (IL); Benjamin Dotan, Doar Na Sade Gat (IL); Elad Haviv, Zurit (IL)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 227 days.

(21) Appl. No.: 13/227,783

(22) Filed: Sep. 8, 2011

(65) Prior Publication Data

US 2012/0170903 A1    Jul. 5, 2012

Related U.S. Application Data

(60) Provisional application No. 61/429,500, filed on Jan. 4, 2011.

(51) Int. Cl.
*H04N 5/775* (2006.01)
*H04N 5/783* (2006.01)
*H04N 21/482* (2011.01)
*H04N 9/804* (2006.01)

(52) U.S. Cl.
CPC .............. *H04N 5/783* (2013.01); *H04N 21/482* (2013.01); *H04N 9/8042* (2013.01)
USPC .......................... 386/230; 386/E5.07; 386/241

(58) Field of Classification Search
CPC ......... G11B 27/05; H04N 5/85; H04N 9/8042
USPC .............................................. 386/230, E5.07
See application file for complete search history.

(56) References Cited

U.S. PATENT DOCUMENTS

| | | | |
|---|---|---|---|
| 6,538,665 B2 | 3/2003 | Crow | |
| 2003/0026342 A1* | 2/2003 | Horiike et al. | 375/240.25 |
| 2003/0038830 A1* | 2/2003 | Bean et al. | 345/719 |
| 2004/0128317 A1* | 7/2004 | Sull et al. | 707/104.1 |
| 2006/0059513 A1* | 3/2006 | Tang et al. | 725/37 |
| 2006/0064716 A1 | 3/2006 | Sull | |
| 2007/0203942 A1* | 8/2007 | Hua et al. | 707/104.1 |
| 2009/0064048 A1* | 3/2009 | Bhattacharya | 715/838 |
| 2010/0247064 A1 | 9/2010 | Yeh | |
| 2010/0272187 A1 | 10/2010 | Civanlar | |
| 2010/0278509 A1 | 11/2010 | Nagano | |
| 2010/0329634 A1* | 12/2010 | Azulai | 386/241 |

FOREIGN PATENT DOCUMENTS

| | | |
|---|---|---|
| EP | 1 986 193 | 10/2008 |
| EP | 2 034 487 | 3/2009 |
| EP | 2 180 700 | 4/2010 |
| KR | 1020070028846 | 3/2007 |
| WO | WO 2009/136236 | 11/2009 |

OTHER PUBLICATIONS

European search report for application No. 12150056.5-1247, mailed Apr. 12, 2012, five pages.

\* cited by examiner

*Primary Examiner* — Thai Tran
*Assistant Examiner* — Girumsew Wendmagegn
(74) *Attorney, Agent, or Firm* — Roach Brown McCarthy & Gruber, P.C.; Kevin D. McCarthy

(57) ABSTRACT

In a user interface a plurality of videos are simultaneously played for the purpose of allowing a user to select the desired video on the basis of a plurality of played frames.

14 Claims, 5 Drawing Sheets

MULTI-VIDEO RENDERING FOR ENHANCING USER INTERFACE USABILITY AND USER EXPERIENCE

CROSS-REFERENCE TO RELATED APPLICATIONS

The present application claims priority to U.S. Provisional Patent Application Ser. No. 61/429,500, filed on Jan. 4, 2011, the entire contents of which being herewith incorporated by reference in its entirety as if fully disclosed herein.

FIELD OF THE INVENTION

The present invention relates to the field of the video processing. More particularly, the invention relates to the simultaneous display of a plurality of video streams on a single display.

BACKGROUND OF THE INVENTION

Many devices are nowadays equipped with video displaying capabilities, starting with personal computers and laptops, and including digital personal assistants, cellular phones, digital tablets and the like. Movies, and video in general, are selected from menus that show digital information regarding them. However, current UIs only offer static images and title to represent the different movies or other objects. Prior art user interfaces only reveal a single frame from the movie, which is generated by the device (and in some instances can be selected by the user), and this presents a problem because the information that can be retrieved from a single frame is limited and insufficient. For example, commercial movies always start with a studio logo and hence a number of movies can have the same thumb. Another example is if the thumb is chosen from a time in which there is no significant information in the picture. In such cases, it is likely that the user will look for further sources of information before choosing his favorite movie, or will start playing the specific movie and watch part of in order to learn more about it. This process naturally takes time and is inefficient.

It is therefore clear that it would be highly desirable to provide means to display dynamic information for the various videos shown in a selection menu. It is an object of the present invention to provide an improved user interface that simultaneously displays enhanced information, in a dynamic way, regarding a plurality of videos available in a selection menu.

It is a further object of the invention to provide a user interface in which a plurality of videos can be displayed as they are played simultaneously.

It is yet another purpose of invention to provide a method for displaying a plurality of different videos that are simultaneously played in a selection menu and to enable selecting therefrom the one that the user wishes to play in an enlarged or full-screen.

It is still a further object of the invention to provide a method for simultaneously displaying a plurality of segments playing from the same video and to enable selecting therefrom the segment that the user wishes to play in an enlarged or full-screen.

Other objects and advantages of the invention will become apparent as the description proceeds.

SUMMARY OF THE INVENTION

In one aspect the invention is directed to a user interface wherein a plurality of videos are simultaneously played for the purpose of allowing a user to select the desired video on the basis of a plurality of played frames.

In one embodiment, the plurality of videos comprises different video sources. In another embodiment the plurality of video comprises segments of the same video taken from different time points.

In another aspect the invention is directed to a method for providing enhanced information to a user wishing to select a video from a plurality of sources displayed in a video selection display, comprising simultaneously streaming a plurality of video streams so as to generate live thumbs in which the movies are played.

For instance, a process according to one embodiment of the invention comprises the steps of:

(a) initializing a hardware decoder, to handle the first movie according to the first movie's parameters;
(b) sending the first substream of the first movie to the hardware decoder and writing it frame by frame to the decoder;
(c) Storing the resulting raw images in a first output buffer;
(d) initializing said hardware decoder to handle the second movie according to the second movie's parameters;
(e) sending the first substream of the second movie to the hardware decoder and writing it frame by frame to the decoder;
(f) storing the resulting raw images are stored in a second output buffer;
(g) initializing the hardware decoder to handle the third movie according to the third movie's parameters;
(h) sending the first sub-stream of the third movie to the hardware decoder;
(i) storing the resulting raw images in a third output buffer;
(j) repeating Steps (a) to (c) for a number of time equal to the number of movies to be handled;
(k) repeating Steps (a) to (c) while decoding the second sub-stream of each movie is decoded; and
(l) repeating Step (k) until all sub-streams of all movies have been decoded.

DETAILED DESCRIPTION OF THE INVENTION

Displaying multi videos simultaneously on screen can enhance the efficiency of the user interface (UI), as well as the user experience. Thus, when searching for a specific movie in a video gallery, the multi-display effect enables the user a preview of several movies playing simultaneously. This provides the user with more information about each movie, compared to current known image thumbnail, and assists the user in choosing the movie he wants to view.

The live thumb contains much more information regarding the movies in the gallery, and hence can make it easier for the user to make his selection. In addition to that, the live content is much more appealing than a static content and creates a better user experience.

The invention allows parallel decoding of many streams or parallel decoding of different time zones of the same stream, and displaying them all at once on the screen of the user.

Since the hardware decoding resources are limited to a number of decoding instances it is possible to decode a limited number of movies in parallel. Each instance is capable of only decoding one movie. In order to bypass this limitation a multiplexing and buffering technique is used. This is illustrated by the following simple example of a case where a single instance hardware decoder is used for decoding three H264 coded movies. Originally this decoder is meant to decode one movie. According to the invention each movie stream is split into substreams. Each substream contains 1 I-frame and subsequent frames until the next I-frame, and hence switching between different movies is possible. At the output of the decoder the resulting raw movie is then split back into three output streams. If the hardware decoder is not capable of changing its initial parameters (resolution, codec etc.) fast enough, an option is to decode and encode part of each movie off-line, to a preselected format and resolution. In such a case the decoder does not need to re-initialize between different movies.

Using the above method inflicts a certain delay to the movie rendering. The delay can be calculated by multiplying the time it takes the decoder to decode a substream by 2 and adding the time it takes to decode an I-frame.

The number of movies that can be decoded simultaneously depends on many parameters such as the input and output resolution, the movie format, and the decoding efficiency. The skilled person will easily determine the number of simultaneously decodable movies, based on the hardware available to him. For example, when using a Samsungs S5PC110 device it was possible to decode 12 movies with source resolution of 480×270 to an output resolution of 200×120. Note that the small output resolution is enough since many movies are displayed on the same screen simultaneously.

Figure 6:
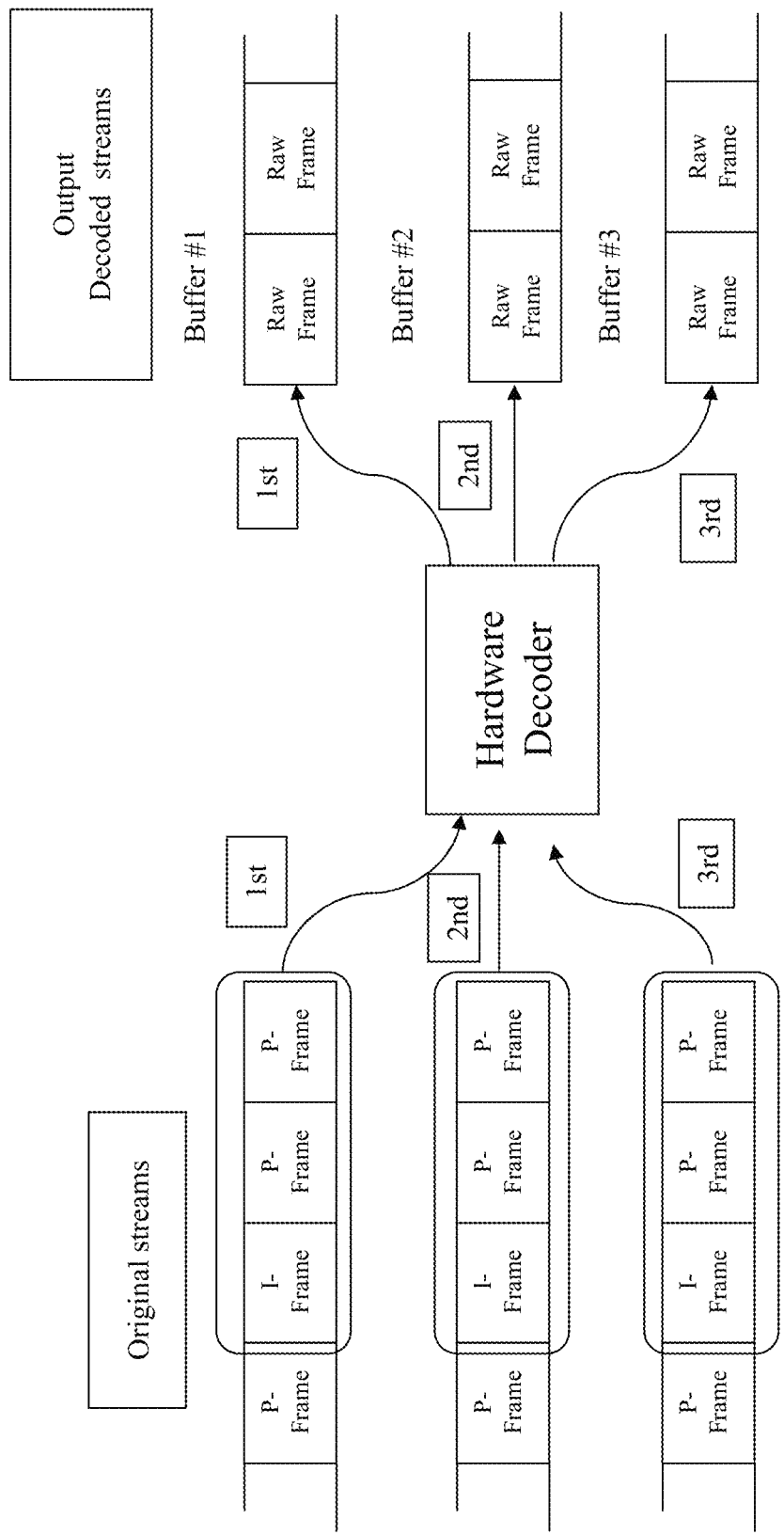
FIG. 6 illustrates the operation of the hardware decoder.

The above is schematically illustrated in FIG. 6. The following steps take place during operation of the decoder in multi-stream mode (still referring to FIG. 6), only three movies being considered, for the sake of brevity:

1) The hardware decoder is initialized to handle the first movie (movie parameters such as resolution and codec are used).
2) The first substream of the first movie is sent to the hardware decoder. It is written frame by frame to the decoder.
3) The resulting raw images are stored in output buffer #1 shown in FIG. 6.
4) The hardware decoder is initialized to handle the second movie (movie parameters such as resolution and codec are used).
5) The first substream of the second movie is sent to the hardware decoder. Again, each frame is written to the decoder.
6) The resulting raw images are stored in output buffer #2 shown in FIG. 6.
7) The hardware decoder is initialized to handle the third movie (movie parameters such as resolution and codec are used).
8) The first substream of the third movie is sent to the hardware decoder.
9) The resulting raw images are stored in output buffer #3 shown in FIG. 6.
10) Once the first frame of output buffer 3 is ready, the rendering of the three movies can start. This limitation inflicts a latency to the process. The latency can be calculated by adding 2 times the decoder processing time for two sub-streams and in addition decoding of the I-frame of the third movie's sub-stream.
11) The process moves back to Step 1 above, but this time the second sub stream of each movie is decoded, and the process continues recursively.

In order to perform according to the method of the invention the decoder must be fast enough in order to decode at a frame rate which is faster than the sum of all movies' FPS (frames per second). For example if the three movies are at 30 FPS the decoder must be able to decode at a frame rate of 3×30=90 FPS. In some cases an off-line preparation of a "lighter" (faster codec, lower resolution etc.) version of the movie or a part of it is needed in order to allow the above limitation.

Hence the invention allows the user to benefits from more informative data regarding the movies in his gallery, and from a more appealing GUI. In addition, by virtue of the invention, the user has the option to control the speed of rendering of the different streams. Thus, a user can select among real time/fast/slow speed independently for each movie displayed. Furthermore, according to the invention the user has the option to combine live thumbs with static thumbs in the same GUI.

Thus, for example a media gallery can include live thumbs for videos and static thumbs for still images.

The technical features of the invention include:
A Hardware/Software engine that allows the user to render multiple video streams concurrently;
Each stream outputs to a specified buffer;
An Engine that allows movie pre-processing transcoding in order to allow decoding bandwidth for a desired GUI design. For example if we have a video gallery and want to display 12 full HD (1920×1080 resolution) movies simultaneously. The hardware engine resources are not capable of parallel decoding of 12 full HD movies but it will be possible to decode 12 "small" (240×180) movies. The pre-processing engine transcodes the 12 movies from high resolution to low resolution and the GUI will then use the smaller resolution sources. Note that since we display all 12 movies at the same time on the screen, the actual displayed resolution is low and hence the full HD resolution is not needed.
The GUI designer (who is the primary addressee of this invention and who will design a GUI using it) can add/remove streams dynamically
The GUI designer stream's current play position
The GUI designer stream's rendering speed
The GUI designer can choose to make the thumb live or still based on the battery state of the device (Since the power consumption increases for live rendering)

The following specific examples will further illustrate the invention.

Live Video Gallery

Figure 1:
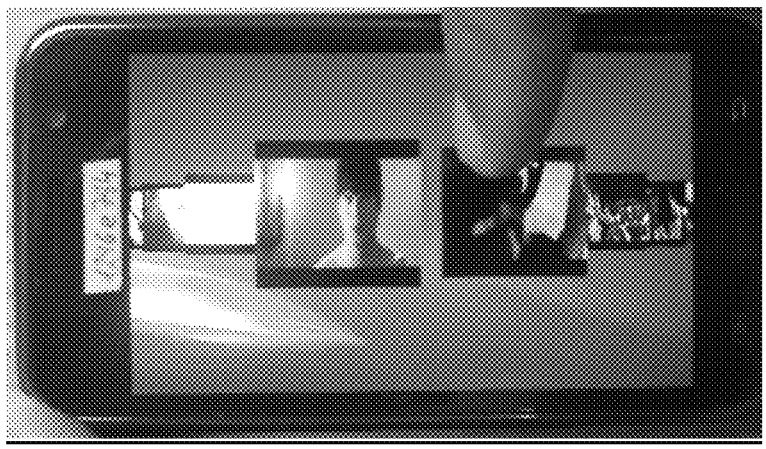
FIG. 1 shows an example of a Live Video Gallery.

FIG. 1 is an example of a Live video gallery according to the invention. The thumbs shown in the figure are not static but rather the movie is playing in them. The Live video gallery allows a user to simultaneously watch various movies displayed on the screen and to obtain more information about each of the movies at the same time. In the example of FIG. 1 swiping the finger over the movies scrolls through the different movies. Touching one of the preview thumbs opens that specific movie in the video player.

Live Chapter (Time Based) Selection UI

Figure 2:
FIG. 2 shows an example of Live Chapter selection.

FIG. 2 illustrates a different situation in which it is desired to select a chapter from a single movie. It should be noted that the thumbs shown in the figure are not static but are playing simultaneously. Simultaneous and parallel streaming of different chapters from the same video is performed as described above. Accordingly, the user gets to see a short segment from each chapter and is therefore able to select the appropriate chapter on the basis of much richer information than that which is supplied by a static thumb. Touching a specific scene opens the movie in the default movie player and in the specific desired chapter.

According to an embodiment of the invention swiping the finger over the screen scrolls the displayed chapters to right or left according to the direction of the swipe. According to another embodiment of the invention a pinch or spread of two fingers zooms in or out, to/from the point of pinch.

Live Forward/Rewind

Figure 3:
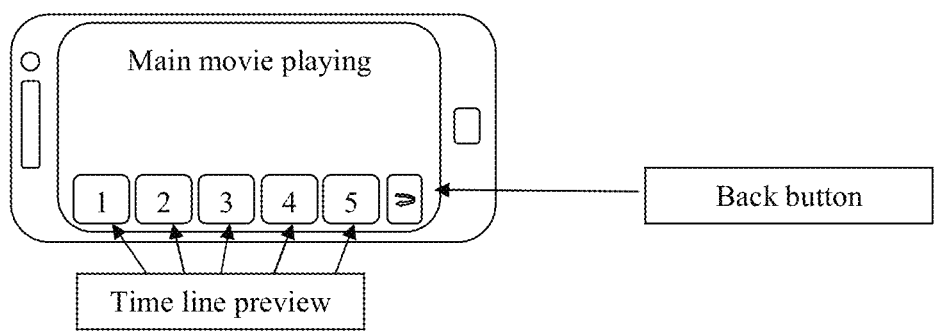
FIG. 3 illustrates a timeline preview display.
Figure 4:
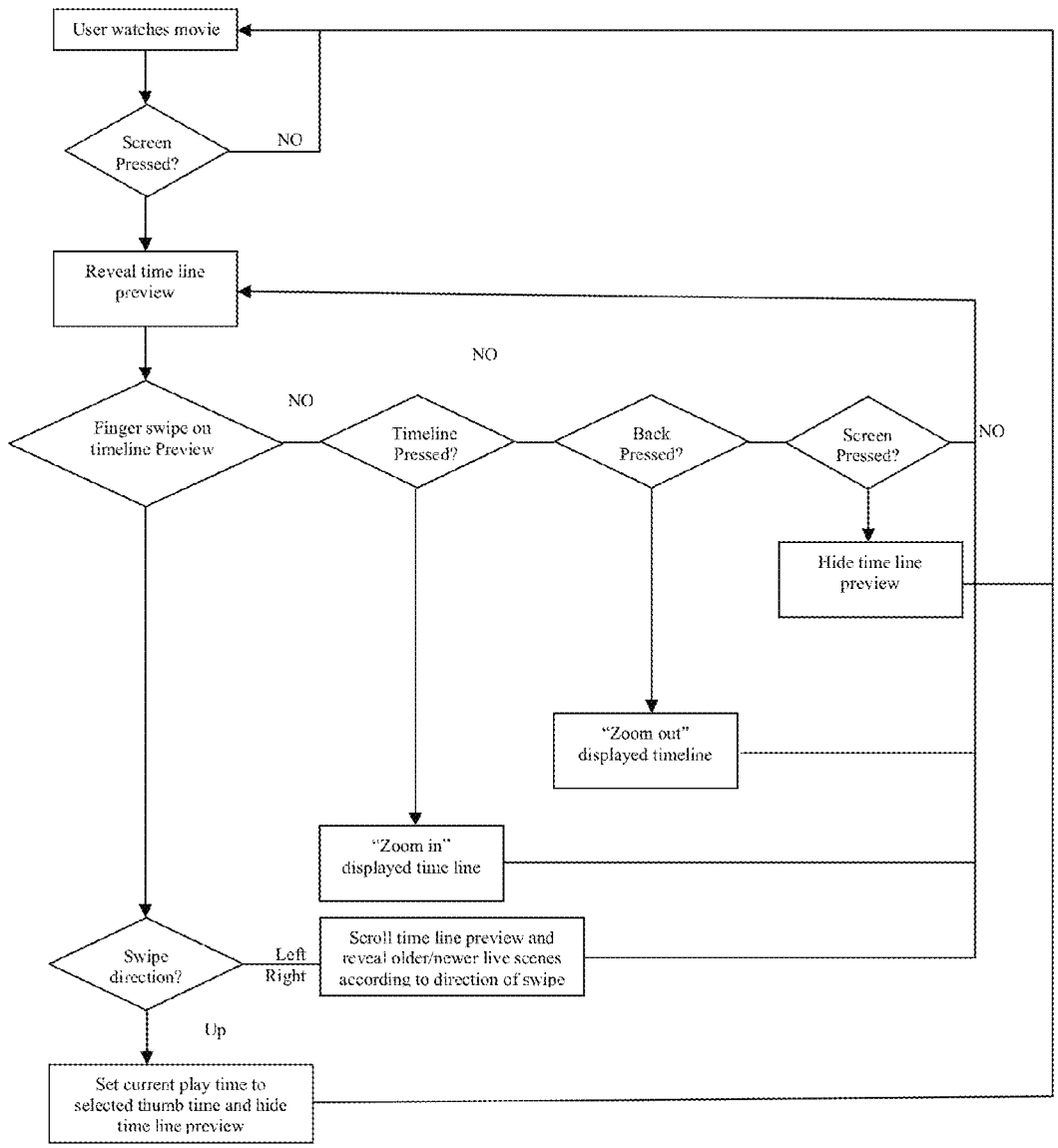
FIG. 4 is a flowchart of a user interface according to an embodiment of the invention.

Another option made possible by the invention is an efficient way of performing Forward and Rewind operations. This is illustrated in FIGS. 3 and 4. In this example once the user watches a movie in the video player he is able to browse through the movies time line with live Forward/Rewind.

UI Flow Chart

The flow chart shown in FIG. 4 describes an example of a user interface. At the beginning the user watches a movie. If he wants to watch a different time line in the movie he first presses the screen. This, in turn, reveals the "time line preview" schematically shown in FIG. 3, which shows small live thumbs of the played movie but in different time. In parallel the movie is still played in the background. For example the live thumb marked in FIG. 3 as 1 can show the movie from 10 min ago, #2 will show the movie 5 minutes ago, #3 will show the movie at the current time, #4 will show 5 minutes ahead and #4 will show 10 minutes ahead. The initial "time grid" in the example is 5 minutes.

If the user swipes his finger over the time preview area the thumbs scrolls and reveals past/future scenes in jumps of 5 minutes. A swipe to the left reveals future thumbs and a swipe to the right past thumbs. For example if the user swipes 2 thumbs to the left the displayed live thumbs will show the current time at thumb #1, 5 minutes ahead at #2, 10 minutes ahead at #3, 15 minutes ahead at #4, 20 minutes ahead at #5.

If the user wants to change the time grid he can press one of the thumbs. This will decrease the time grid by half, e.g. the time between each thumb displayed will be 2.5 minutes instead of 5 minutes, and will make the center preview thumb render the time that was of the pressed thumb. If in the above example the user presses thumb #5 which after scrolling displayed 20 minutes ahead, the new time preview will include the following thumbs:

At preview thumb #1—15 minutes ahead
At preview thumb #2—17.5 minutes ahead
At preview thumb #3—20 minutes ahead.
At preview thumb #4—22.5 minutes ahead
At preview thumb #5—25 minutes ahead
This means the actual time grid is 2.5 minutes.

Another option to change the time grid is to press the back button which sets the time grid back to its last value.

If the user found the time position he wants to watch in one of the thumbs he needs to swipe his finger up on that thumb. The current play time will jump to the time position of the selected thumb and the time line preview will be hidden.

Live Contact List

The parallel decoding of streams may also be used to enhance the contact list by creating a "Live Contact List".

Instead of having a static image next to a name on the contact list, the user can take a short video of that person and use it in a list that operates according to the invention. The UI allows the user to simultaneously see movies that shows each contact. This makes the contact list application much more appealing to the user. Swiping the finger up or down on screen will scroll through the different contacts. Selection of the contact will show the contacts details and will allow various options as in current contacts application.

Figure 5:
FIG. 5 shows an example of a Live Contact List.

This option is illustrated in FIG. 5, which, of course, the thumb shown are running each its own short video according to the invention, and are not static thumbs.

The invention claimed is:

1. A computerized device comprising:
    (a) a display with video displaying capabilities;
    (b) a processor operating in combination with an engine for rendering and simultaneously playing a plurality of video streams in corresponding live thumbs;
    wherein said processor is operable to generate in said display a user interface rendered with one or more input elements for the purpose of allowing a user of said computerized device to select a desired video to be displayed on said display, on the basis of a plurality of played frames,
    wherein each of said corresponding thumbs is scrollable by said one or more input elements in order to display a part or a future scene; and
    (c) a decoder for circularly processing all sub-streams of said elected video one by one according to sub-stream processing,
    wherein the sub-stream processing repeats:
        (i) initializing the decoder to handle the video to be handled, according to parameters of a video to be handled;
        (ii) sending a sub-stream of the video to be handled to the decoder and writing the sub-stream in the decoder frame by frame; and
        (iii) storing resulting raw images in an output buffer corresponding to the video to be handled, until all sub-streams of the videos are decoded,
    wherein the sub-stream included one I-frame and subsequent frames until the next I-frame.

2. The computerized device according to claim 1, wherein the plurality of videos are derived from different video sources.

3. The computerized device according to claim 1, wherein the plurality of video comprises segments of the same video taken from different time points.

4. The computerized device according to claim 3, wherein a timeline preview that includes live thumbs corresponding to different times of the video being played is displayable on a screen on which a video selected from the videos is played;
    wherein the live thumbs are arranged in a chronological order which is based on a time grid.

5. The computerized device according to claim 4, wherein a time interval between two scenes displayed on two adjacent thumbs of the time grid, respectively, is controllable.

6. The computerized device according to claim 1, wherein the scrolled thumb is selectively touchable in order to zoom in or zoom out the scene displayed within borders of the scrolled thumb.

7. The computerized device according to claim 1, wherein thumbs are scrolled using a touchscreen.

8. A method for providing enhanced information to a user wishing to select a video from a plurality of sources displayed in a video selection display, the method comprising the steps of:

(a) simultaneously streaming a plurality of video streams so as to generate live thumbs in which video corresponding to each of the videos of the plurality of sources is played;
(b) selecting one of said thumbs for reviewing purposes;
(c) scrolling said selected thumb to display a past or a future scene;
(d) splitting each movie stream into sub-streams; and
(e) circularly processing all sub-streams of the videos one by one with respect to the videos according to sub-stream processing by a decoder,
    wherein the sub-stream processing repeats, until all sub-streams of the videos are decoded, according to the steps of:
    initializing the decoder to handle the video to be handled, according to parameters of a video to be handled;
    sending a sub-stream of the video to be handled to the decoder and writing the sub-stream in the decoder frame by frame;
    storing resulting raw images in an output buffer corresponding to the video to be handled, wherein each sub-stream includes one I-frame and subsequent frames until the next I-frame; and
    switching between different movies at time points when an I-frame appears.

9. The method according to claim 8, wherein the plurality of sources comprises different videos.

10. The method according to claim 8, wherein the plurality of sources comprises segments of the same video taken from different time points.

11. The method according to claim 10, further comprising the step of displaying a timeline preview including live thumbs corresponding to different times of the video being played on a screen on which a video selected from the videos is played,
    wherein the live thumbs are arranged in a chronological order which is based on a time grid.

12. The method according to claim 10, wherein a time interval between two scenes displayed on two adjacent thumbs of the time grid, respectively, is controllable.

13. The method according to claim 8, further comprising the step of selectively touching the scrolled thumb to display a video at a scene corresponding to a scrolled position thereof.

14. The method according to claim 13, wherein the scrolled thumb is selectively touched in order to zoom in or zoom out the scene displayed within borders of the scrolled thumb.

* * * * *